US012643598B2

(12) United States Patent
Kurosu

(10) Patent No.: US 12,643,598 B2
(45) Date of Patent: Jun. 2, 2026

(54) DRIVING CONTROL APPARATUS

(71) Applicant: Honda Motor Co., Ltd., Tokyo (JP)

(72) Inventor: Chihiro Kurosu, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 19/057,671

(22) Filed: Feb. 19, 2025

(65) Prior Publication Data

US 2025/0269899 A1 Aug. 28, 2025

(30) Foreign Application Priority Data

Feb. 26, 2024 (CN) .......................... 202410209820.5

(51) Int. Cl.
| | |
|---|---|
| *B62D 6/04* | (2006.01) |
| *B60W 30/10* | (2006.01) |
| *B62D 6/00* | (2006.01) |
| *B62D 15/02* | (2006.01) |

(52) U.S. Cl.
CPC ............. *B62D 6/002* (2013.01); *B60W 30/10* (2013.01); *B62D 6/003* (2013.01); *B62D 6/005* (2013.01); *B62D 6/04* (2013.01); *B62D 15/021* (2013.01)

(58) Field of Classification Search
CPC ....... B60W 30/10; B62D 6/002; B62D 6/003; B62D 6/005; B62D 6/04; B62D 15/021; B62D 15/025
See application file for complete search history.

(56) References Cited

U.S. PATENT DOCUMENTS

| | | | |
|---|---|---|---|
| 2015/0039183 A1* | 2/2015 | Yang ..................... | B60W 10/22 |
| | | | 701/42 |
| 2017/0088176 A1* | 3/2017 | Tamura ................ | B62D 15/025 |
| 2018/0118263 A1* | 5/2018 | Schiebahn ............ | B60W 30/10 |
| 2021/0282310 A1* | 9/2021 | Birkland .............. | B60W 50/14 |
| 2025/0187658 A1* | 6/2025 | Tsukuda ................ | B62D 6/008 |

FOREIGN PATENT DOCUMENTS

JP        005207864 B        6/2013

* cited by examiner

*Primary Examiner* — Erick R Solis
(74) *Attorney, Agent, or Firm* — Duft & Bornsen, PC

(57) ABSTRACT

A driving control apparatus includes: a sensor configured to detect a steering angular velocity; and a microprocessor. The microprocessor is configured to perform: generating a target path of a subject vehicle controlling a steering actuator of the subject vehicle to travel following the target path; and recognizing a position of the subject vehicle. The microprocessor is configured to perform the controlling including calculating a compensated steering angle quantity necessary for maintaining a driving state in which the subject vehicle travels while following the target path, based on a curvature of the target path, a deviation amount in a lane width direction between the position of the subject vehicle and the target path, and the steering angular velocity detected by the sensor, and also controlling the steering actuator based on the compensated steering angle quantity.

7 Claims, 5 Drawing Sheets

DRIVING CONTROL APPARATUS

CROSS-REFERENCE TO RELATED APPLICATION

This application is based upon and claims the benefit of priority from Chinese patent application Ser. No. 202410209820.5 filed on Feb. 26, 2024, the content of which is incorporated herein by reference.

BACKGROUND

Technical Field

The present invention relates to a driving control apparatus configured to control the traveling of a vehicle.

Related Art

As this type of device, a device has been conventionally known for assisting the steering of a subject vehicle so that the subject vehicle travels along a target route that has been set (see, for example, JP 5207864 B2). In the device described in JP 5207864 B2, when an occurrence of a crosswind is estimated, based on an exterior environment in the surroundings of the subject vehicle such as weather or a traffic situation, an allowable error with respect to the target route is reduced so as to improve the accuracy of steering assist.

However, in the device described in JP 5207864 B2, the steering is assisted, based on prediction of an occurrence of a disturbance such as the crosswind. Hence, in a case where a prediction value of the disturbance and an actual measured value are different from each other, it is difficult to satisfactorily assist the steering.

SUMMARY

An aspect of the present invention is a driving control apparatus includes: a sensor configured to detect a steering angular velocity; and a microprocessor. The microprocessor is configured to perform: generating a target path of a subject vehicle controlling a steering actuator of the subject vehicle to travel following the target path; and recognizing a position of the subject vehicle. The microprocessor is configured to perform the controlling including calculating a compensated steering angle quantity necessary for maintaining a driving state in which the subject vehicle travels while following the target path, based on a curvature of the target path, a deviation amount in a lane width direction between the position of the subject vehicle and the target path, and the steering angular velocity detected by the sensor, and also controlling the steering actuator based on the compensated steering angle quantity.

BRIEF DESCRIPTION OF DRAWINGS

The objects, features, and advantages of the present invention will become clearer from the following description of embodiments in relation to the attached drawings, in which.

DETAILED DESCRIPTION OF THE INVENTION

Hereinafter, embodiments of the present invention will be described with reference to FIGS. 1 to 7. A driving control apparatus according to an embodiment of the present invention is applicable to, for example, a vehicle having a self-driving capability, that is, a self-driving vehicle. Note that the driving control apparatus according to an embodiment of the present invention is applicable to both a manual driving vehicle and a self-driving vehicle having a driving assistance capability. However, hereinafter, for convenience of description, a case where the driving control apparatus is applied to the self-driving vehicle will be given as an example. Note that a vehicle to which the driving control apparatus according to this embodiment is applied may be referred to as a subject vehicle in order to be distinguished from other vehicles. The subject vehicle may be any of an engine vehicle having an internal combustion engine (engine) as a driving power source, an electric vehicle having a driving motor as a driving power source, and a hybrid vehicle having an engine and a driving motor as a driving power source. The subject vehicle is capable of driving not only in a self-drive mode that does not require a driver's driving operation but also in a manual drive mode that requires a driver's driving operation.

Figure 1:
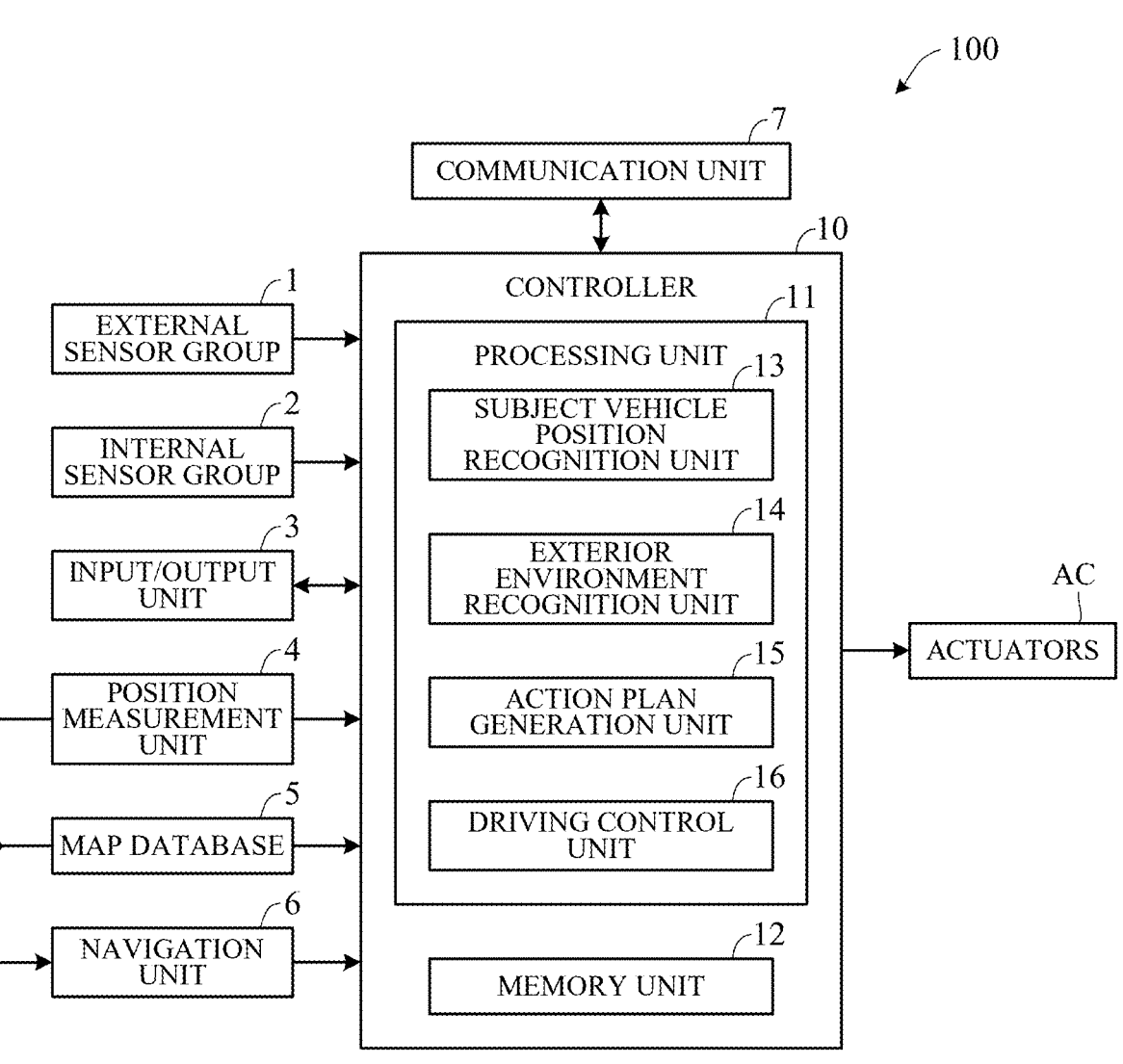
FIG. 1 is a block diagram schematically illustrating an overall configuration of a vehicle control system including a driving control apparatus according to an embodiment of the present invention.

First, a schematic configuration of the subject vehicle related to self-driving will be described. FIG. 1 is a block diagram schematically illustrating an overall configuration of a vehicle control system 100 of the subject vehicle including a driving control apparatus according to an embodiment of the present invention. As illustrated in FIG. 1, the vehicle control system 100 mainly includes a controller 10, an external sensor group 1, an internal sensor group 2, an input/output device 3, a position measurement unit 4, a map database 5, a navigation unit 6, a communication unit 7, and a traveling actuator AC, each of which is communicably connected with the controller 10.

The "external sensor group 1" is a generic term for a plurality of sensors (external sensors) that detect an external situation that is surrounding information of the subject vehicle. For example, the external sensor group 1 includes a LiDAR that measures scattered light with respect to irradiation light in all directions of the subject vehicle and measures a distance from the subject vehicle to a surrounding obstacle, a radar that detects other vehicles, obstacles, and the like in the surroundings of the subject vehicle by irradiating with electromagnetic waves and detecting reflected waves, and a camera that is mounted on the subject vehicle, that has an imaging element such as a charge coupled device (CCD) or a complementary metal oxide semiconductor (CMOS), and that captures images of the surroundings (forward side, rearward side, and lateral sides) of the subject vehicle.

The "internal sensor group 2" is a generic term for a plurality of sensors (internal sensors) that detect a driving state of the subject vehicle. For example, the internal sensor group 2 includes a vehicle speed sensor that detects a vehicle speed of the subject vehicle, an acceleration sensor that detects acceleration in a front-rear direction of the subject vehicle and acceleration in a left-right direction (lateral acceleration) of the subject vehicle, a rotation sensor that detects the number of rotations of the driving power source, and a yaw rate sensor that detects a rotation angular speed around a vertical axis of the center of gravity of the subject vehicle. The internal sensor group 2 also includes a sensor that detects a driver's driving operation in the manual drive mode, for example, an operation on an accelerator pedal, an operation on a brake pedal, an operation on a steering wheel, and the like.

The input/output device 3 is a generic term for devices into which the driver inputs a command or from which the driver receives a command. For example, the input/output device 3 includes various switches into which the driver inputs various commands by operating an operation member, a microphone into which the driver inputs commands by voice, a display that provides information for the driver via a display image, a speaker that provides information for the driver by sounds, and the like.

The position measurement unit (global navigation satellite system (GNSS) unit) 4 includes a position measurement sensor that receives a positioning signal that has been transmitted from a positioning satellite. The positioning satellite is an artificial satellite such as a global positioning system (GPS) satellite or a quasi-zenith satellite. The position measurement unit 4 uses positioning information that has been received by the position measurement sensor to measure a current position (latitude, longitude, and altitude) of the subject vehicle.

The map database 5 is a device that stores general map information to be used by the navigation unit 6, and includes, for example, a magnetic disk or a semiconductor element. The map information includes position information of roads, information of road shapes (curvatures or the like), and position information of intersections and branch points. Note that the map information stored in the map database 5 is different from highly precise map information stored in a memory unit 12 of the controller 10.

The navigation unit 6 is a device that searches for a target route to a destination on a road that has been input by a driver, and also gives guidance along the target route. The input of the destination and the guidance along the target route are made via the input/output device 3. The target route is calculated, based on a current position of the subject vehicle that has been measured by the position measurement unit 4 and the map information stored in the map database 5. It is possible to measure the current position of the subject vehicle using detection values of the external sensor group 1, and the target route may be calculated, based on the current position and the highly precise map information stored in the memory unit 12.

The communication unit 7 communicates with various servers, not illustrated, via a network including a wireless communication network represented by the Internet network, a mobile telephone network, or the like, and acquires map information, driving history information, traffic information, and the like from the servers regularly or at any timing. Driving history information of the subject vehicle may be transmitted to the server via the communication unit 7 in addition to the acquisition of the driving history information. The network includes not only a public wireless communication network but also a closed communication network provided for every predetermined management area, for example, a wireless LAN, Wi-Fi (registered trademark), Bluetooth (registered trademark), and the like. The map information that has been acquired is output to the map database 5 or the memory unit 12, and the map information is updated.

The actuator AC is a traveling actuator for controlling traveling of the subject vehicle. In a case where the driving power source is an engine, the actuator AC includes a throttle actuator that adjusts an opening (throttle opening) of a throttle valve of the engine. In a case where the driving power source is a traveling motor, the actuator AC includes a traveling motor. The actuator AC also includes a braking actuator that actuates a braking device of the subject vehicle and a rudder actuator that actuates a rudder device.

The controller 10 includes an electronic control unit (ECU). More specifically, the controller 10 includes a computer including a processing unit 11 such as a CPU (microprocessor), the memory unit 12 such as a ROM and a RAM, and other peripheral circuits, not illustrated, such as an I/O interface. Note that a plurality of ECUs having different functions such as an engine control ECU, a driving motor control ECU, and a braking device ECU can be separately provided, but in FIG. 1, the controller 10 is illustrated as an aggregation of these ECUs as a matter of convenience.

The memory unit 12 stores highly precise and detailed road map information for self-driving. The road map information includes road position information, information of a road shape (curvature or the like), information of a road gradient, position information of an intersection or a branch point, information of a type and a position of a division line such as a white line, information of the number of lanes, width of a lane and position information for every lane (information of a center position of a lane or a boundary line of a lane position), position information of a landmark (a traffic light, a sign, a building, or the like) as a mark on a map, and information of a road surface profile such as unevenness of a road surface. The map information stored in the memory unit 12 may include map information that has been acquired from the outside of the subject vehicle via the communication unit 7, or may include map information created by the subject vehicle itself using detection values of the external sensor group 1 or detection values of the external sensor group 1 and the internal sensor group 2. The memory unit 12 also stores information of various control programs and thresholds for use in the programs.

The processing unit 11 includes a subject vehicle position recognition unit 13, an exterior environment recognition unit 14, an action plan generation unit 15, and a driving control unit 16 as functional configurations.

The subject vehicle position recognition unit 13 recognizes a position of the subject vehicle (subject vehicle position) on the map, based on the position information for the subject vehicle that has been obtained by the position measurement unit 4 and the map information in the map database 5. The subject vehicle position may be recognized using the map information stored in the memory unit 12 and surrounding information of the subject vehicle that has been detected by the external sensor group 1, and thus it becomes possible to recognize the subject vehicle position with high accuracy. The movement information (a moving direction and a moving distance) of the subject vehicle may be calculated, based on the detection values of the internal sensor group 2, and thus the subject vehicle position can also be recognized. Note that in a case where the subject vehicle position can be measured by a sensor installed on a road or outside a road side, the subject vehicle position can also be recognized by communicating with the sensor via the communication unit 7.

The exterior environment recognition unit 14 recognizes an external situation in the surroundings of the subject vehicle, based on a signal from the external sensor group 1 such as a LiDAR, a radar, and a camera. For example, a position, a speed, and acceleration of a surrounding vehicle (a forward vehicle or a rearward vehicle) traveling in the surroundings of the subject vehicle, a position of a surrounding vehicle stopped or parked in the surroundings of the subject vehicle, and positions and states of other objects are recognized. The other objects include a sign, a traffic light, a road, a building, a guardrail, a utility pole, a signboard, a pedestrian, a bicycle, and the like. Indications such as division lines (such as white lines) and stop lines on a road surface are also included in the other objects (roads). The states of the other objects include a color (red, green, or yellow) of a traffic light, a moving speed and a direction of a pedestrian or a bicycle, and the like. A part of a stationary object among the other objects constitutes a landmark serving as an index of the position on the map, and the exterior environment recognition unit 14 also recognizes the position and type of the landmark.

The action plan generation unit 15 generates a driving path (target path) of the subject vehicle from a current time to a predetermined time ahead, based on, for example, the target route that has been calculated by the navigation unit 6, the map information stored in the memory unit 12, the subject vehicle position that has been recognized by the subject vehicle position recognition unit 13, and the external situation that has been recognized by the exterior environment recognition unit 14. In a case where there are a plurality of paths that are candidates for the target path on the target route, the action plan generation unit 15 selects, from among the plurality of paths, an optimal path that satisfies criteria such as compliance with laws and regulations and efficient and safe driving, and sets the selected path as the target path. Then, the action plan generation unit 15 generates an action plan corresponding to the target path that has been generated. The action plan generation unit 15 generates various action plans corresponding to driving modes, such as overtaking driving for overtaking a preceding vehicle, lane change driving for changing driving lanes, follow driving for following a preceding vehicle, lane keep driving for keeping the lane not to deviate from the driving lane, deceleration driving, or acceleration driving. In generating the target path, the action plan generation unit 15 first determines a driving mode, and then generates the target path, based on the driving mode.

In the self-drive mode, the driving control unit 16 controls each actuator AC such that the subject vehicle travels along the target path that has been generated by the action plan generation unit 15. More specifically, in consideration of a driving resistance determined by a road gradient or the like in the self-drive mode, the driving control unit 16 calculates a requested driving force for obtaining target acceleration per unit time that has been calculated by the action plan generation unit 15. Then, for example, the actuator AC is feedback-controlled so that actual acceleration that has been detected by the internal sensor group 2 becomes the target acceleration. More specifically, the actuator AC is controlled so that the subject vehicle travels at a target vehicle speed and the target acceleration. Note that in the manual drive mode, the driving control unit 16 controls each of the actuators AC in accordance with a driving command (steering operation or the like) from the driver that has been acquired by the internal sensor group 2.

Figure 2:
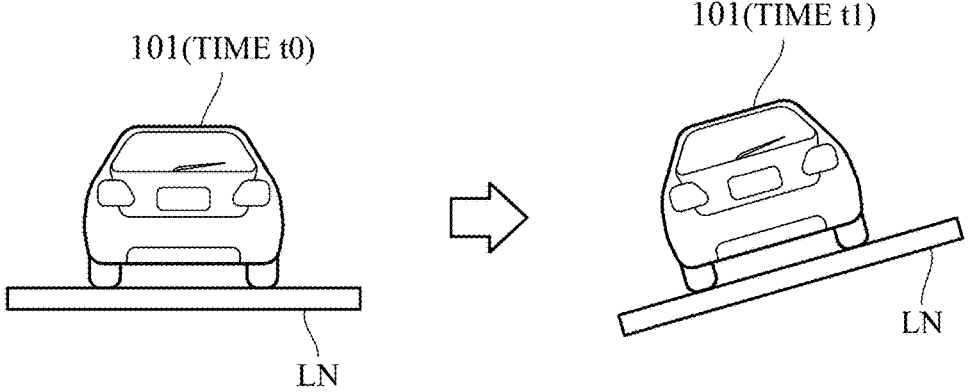
FIG. 2 is a diagram illustrating an example of a vehicle while in the lane keep driving.

In the lane keep driving, by the way, the rudder actuator (hereinafter, also referred to as a steering actuator) is controlled so that the subject vehicle travels while following a target path in a lane width direction. However, when a disturbance such as a change in inclination of the road surface (a change in the inclination in the lane width direction) or a strong wind occurs, the position of the subject vehicle in the lane width direction may deviate from a target position. FIG. 2 is a diagram illustrating an example of the subject vehicle 101 while in the lane keep driving. FIG. 2 schematically illustrates a state in which the subject vehicle 101 is viewed from the rear side at time $t_0$ and time $t_1$ which is a time after time $t_0$. As illustrated in FIG. 2, a lane LN on which the subject vehicle 101 travels includes a flat road (right diagram) having a gradient of zero in the lane width direction and an inclined road (left diagram) inclined in the lane width direction. In the inclined road in the left drawing, the road surface on the right side in the advancing direction is higher than the road surface on the left side. In this manner, when the inclination in the lane width direction of the lane LN on which the subject vehicle 101 is traveling changes, while in the lane keep driving, the position of the subject vehicle 101 in the lane width direction may deviate from the target position (lane center). In the example of FIG. 2, there is a possibility that the position in the lane width direction of the subject vehicle 101 deviates to the left from the target position. On the other hand, a method for eliminating a positional deviation is proposed by controlling the steering actuator, based on a deviation amount in position (a deviation amount from the target position) in the lane width direction of the subject vehicle 101. However, with such a method, it may take time from an occurrence of the positional deviation to elimination of the positional deviation, and it may not be possible to conduct satisfactory lane keep driving. Therefore, in the present embodiment, the driving control apparatus is configured as follows to enable prompt action on the positional deviation in the lane width direction of the vehicle caused by the disturbance that occurs while in the lane keep driving.

Figure 3:
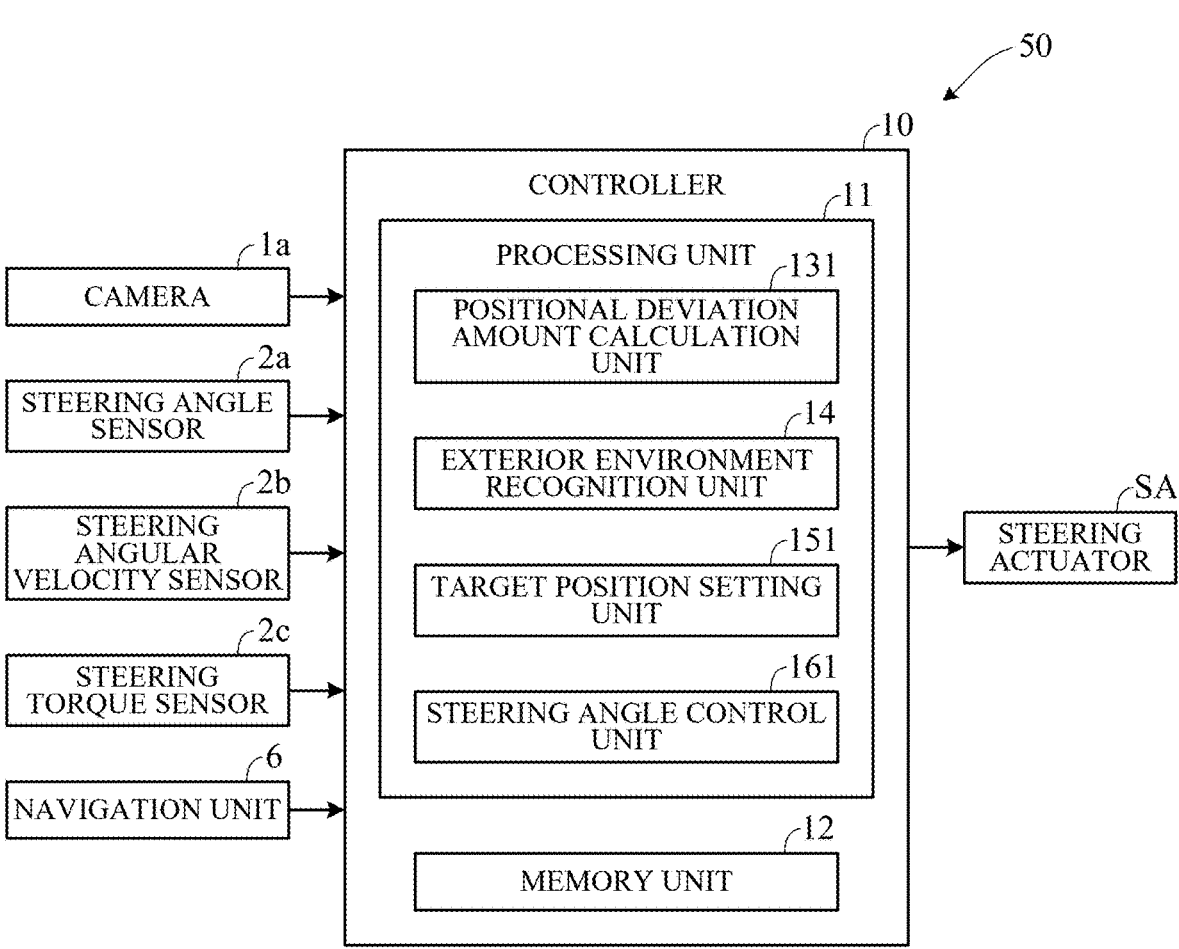
FIG. 3 is a block diagram of a configuration of main components of the driving control apparatus according to the embodiment of the present invention.

FIG. 3 is a block diagram of a configuration of main components of a driving control apparatus 50 according to the present embodiment. The driving control apparatus 50 constitutes a part of the vehicle control system 100 illustrated in FIG. 1. As illustrated in FIG. 3, the driving control apparatus 50 includes the controller 10, a camera 1*a*, a steering angle sensor 2*a*, a steering angular velocity sensor 2*b*, a steering torque sensor 2*c*, a navigation unit 6, and a steering actuator SA.

The camera 1*a* is a monocular camera including an imaging element (image sensor) such as a CCD or a CMOS, and constitutes a part of the external sensor group 1 in FIG. 1. The camera 1*a* may be a stereo camera. The camera 1*a* is mounted at a predetermined position, for example, in a front part of the subject vehicle, and continuously images a space on a forward side of the subject vehicle to acquire an image (camera image) of a target object. The target object includes a division line that defines a lane on a road. Note that the target object may be detected by a radar or a LiDAR instead of the camera 1*a* or together with the camera 1*a*.

The steering angle sensor 2*a* detects a rotation angle (steering angle) of a steering shaft (not illustrated) coupled to a steering wheel ST in FIG. 6 to be described later. The steering angular velocity sensor 2*b* detects a rotation angular velocity (also referred to as a steering angular velocity) of the steering shaft. The steering torque sensor 2*c* detects a steering operation by the driver, more specifically, steering torque that acts on the steering wheel ST. Note that the steering angle detected by the steering angle sensor 2a when the steering wheel ST is rotated leftward (counterclockwise) from the neutral position has a positive value, and the steering angle detected by the steering angle sensor 2a when the steering wheel ST is rotated rightward (clockwise) from the neutral position has a negative value.

The controller 10 in FIG. 3 includes a positional deviation amount calculation unit 131, the exterior environment recognition unit 14, a target position setting unit 151, and a steering angle control unit 161 as functional configurations of the processing unit 11 (FIG. 1). In addition, the controller 10 includes the memory unit 12. Note that the positional deviation amount calculation unit 131 constitutes a part of the subject vehicle position recognition unit 13. The target position setting unit 151 constitutes a part of the action plan generation unit 15. The steering angle control unit 161 constitutes a part of the driving control unit 16.

The target position setting unit 151 sets a target position in the lane width direction through which the subject vehicle 101 should pass on the target route, based on the target route that has been set by the navigation unit 6 and an exterior environment situation that has been recognized by the exterior environment recognition unit 14. While the subject vehicle 101 is in the lane keep driving, the target position setting unit 151 repeatedly sets the target position along an advancing direction. As a result, a target path (a path obtained by connecting the target positions) is generated on the target route. Note that when the exterior environment recognition unit 14 recognizes an obstacle such as a utility pole or a parked vehicle on a forward side in the advancing direction of the subject vehicle 101, the target position setting unit 151 sets the target position so that the distance between the subject vehicle 101 and the obstacle in the lane width direction is not shorter than a certain distance when the subject vehicle 101 passes on a lateral side of the obstacle. In addition, when a lane change instruction is input from the driver via a direction indicator (not illustrated), the target position setting unit 151 sets the target position so that the traveling position of the subject vehicle 101 gradually moves to the center of the lane which is a lane change destination along the advancing direction.

The positional deviation amount calculation unit 131 calculates a deviation amount in the lane width direction between the position of the subject vehicle 101 that has been recognized by the subject vehicle position recognition unit 13 and the target position (target path) that has been set by the target position setting unit 151. The target position in the lane keep driving is set on the lane LN on which the subject vehicle 101 is traveling and at the center of the lane to be apart on the forward side from the subject vehicle 101 by a predetermined distance. The positional deviation amount calculation unit 131 first recognizes the position and the shape of the division line that defines the lane LN from the camera image of the camera 1a, and recognizes the lane LN, based on its recognition result. Next, the positional deviation amount calculation unit 131 estimates the position in the lane width direction of the subject vehicle 101 when the subject vehicle 101 reaches the position on the forward side by the predetermined distance, based on the recognized position and shape of the lane LN, the detection value of the steering angle sensor 2a, and the like. Finally, the positional deviation amount calculation unit 131 calculates a deviation amount of the position in the lane width direction of the subject vehicle 101 from the target position (lane center) (hereinafter, referred to as a lateral positional deviation amount or a lateral positional deviation) that has been recognized by the above estimation. The positional deviation amount calculation unit 131 may calculate the deviation amount from the target position using the subject vehicle position that has been recognized, based on the map information stored in the memory unit 12 and the surrounding information of the subject vehicle that has been detected by the external sensor group 1 or the subject vehicle position that has been measured by the position measurement unit 4.

The steering angle control unit 161 controls the steering actuator SA so that the subject vehicle 101 travels while following a target position (target path) in the lane width direction. Here, the control of the steering actuator SA by the steering angle control unit 161 will be described. The steering angle control unit 161 estimates state quantities including a steering angle quantity (hereinafter, referred to as a reference steering angle quantity) necessary for maintaining the position of the subject vehicle 101 on the target position, and calculates a correction steering angle quantity for following the route. In estimating the state quantities, the steering angle control unit 161 first observes (acquires) the state quantities such as a steering angular velocity, a lateral positional deviation, a direction of the vehicle body of the subject vehicle 101 (hereinafter, referred to as a vehicle body direction) with respect to the target path, and a yaw angular velocity deviation. The steering angular velocity may be a sensor value of the steering angular velocity sensor 2b, or may be a value that has been calculated, based on a sensor value of the steering angle sensor 2a. The yaw angular velocity deviation denotes a deviation between the yaw angular velocity (yaw rate) that has been detected by the yaw rate sensor included in the internal sensor group 2 and a target yaw angular velocity (obtained by multiplying a translation velocity of the subject vehicle 101 by a route curvature). In addition, the steering angle control unit 161 calculates the curvature of the target path (hereinafter, referred to as the route curvature) on a forward side in the advancing direction of the subject vehicle 101.

Next, the steering angle control unit 161 inputs the observed state quantities (steering angular velocity, lateral positional deviation, vehicle body direction, and yaw angular velocity deviation) and the calculated route curvature into a driving simulation model (hereinafter, referred to as the driving model). The driving model simulates the lane keep driving of the vehicle on a model. Using the observed values of the state quantities such as the steering angular velocity and the route curvature as input values, the driving model estimates and outputs a change in state quantities such as the vehicle body direction, the lateral positional deviation, the yaw angular velocity, and the steering angle quantity. When no disturbance such as a change in the inclination of the road surface (a change in the inclination in the lane width direction) or no strong wind occurs on the road (straight road) on which the subject vehicle 101 is traveling, the yaw angular velocity, the lateral positional deviation, and the vehicle body direction input into the driving model do not change, and thus the steering angle quantity of the vehicle on the driving model remains zero. On the other hand, when a disturbance occurs, for example, when a change in the inclination of the road surface occurs as illustrated in FIG. 2, the yaw angular velocity, the lateral positional deviation, and the vehicle body direction input into the driving model change. Hence, if the steering angle quantity of the vehicle on the driving model remains zero, the traveling position of the vehicle will gradually deviate to the left from the target path. The steering angle control unit 161 provides feedback based on a deviation between the state quantity (an estimated value) and the state quantity (an observed value) that have been output from the driving model, and estimates a steering angle quantity (a reference steering angle quantity) necessary for cancelling the influence of the disturbance, that is, for returning the traveling position of the vehicle to the target path on the driving model. Note that the driving model may be generated by machine learning or the like, or may be written, based on physical laws.

In addition, the steering angle control unit 161 calculates a correction steering angle quantity, based on the route curvature and the target position (target position in the lane width direction). The correction steering angle quantity denotes a steering angle quantity for the subject vehicle 101 to travel along the target path. In a case where the target path of the subject vehicle 101 is a straight line, the correction steering angle quantity is zero. On the other hand, in a case where the target path has a curvature, such as a case where the subject vehicle 101 is traveling on a curved road or is changing lanes, the correction steering angle quantity is a positive or negative value.

Furthermore, the steering angle control unit 161 controls the steering actuator SA in accordance with the compensated steering angle quantity obtained by adding the estimated reference steering angle quantity to the correction steering angle quantity that has been calculated. Note that while the steering angle control unit 161 is conducting the steering angle control based on the compensated steering angle quantity (hereinafter, referred to as offset steering angle control), when the steering torque sensor 2c detects the steering torque, the steering angle control unit 161 determines that the driver has performed a steering operation (has given a change instruction to change the steering angle quantity), and interrupts the offset steering angle control. In this situation, while conducting the offset steering angle control, the steering angle control unit 161 may continue the offset steering angle control, unless the steering torque sensor 2c detects large steering torque from which the driver's intention to release the lane keep driving can be clearly understood, more specifically, unless the driver performs a steering operation of changing the steering angle quantity equal to or larger than a predetermined quantity.

Figure 4:
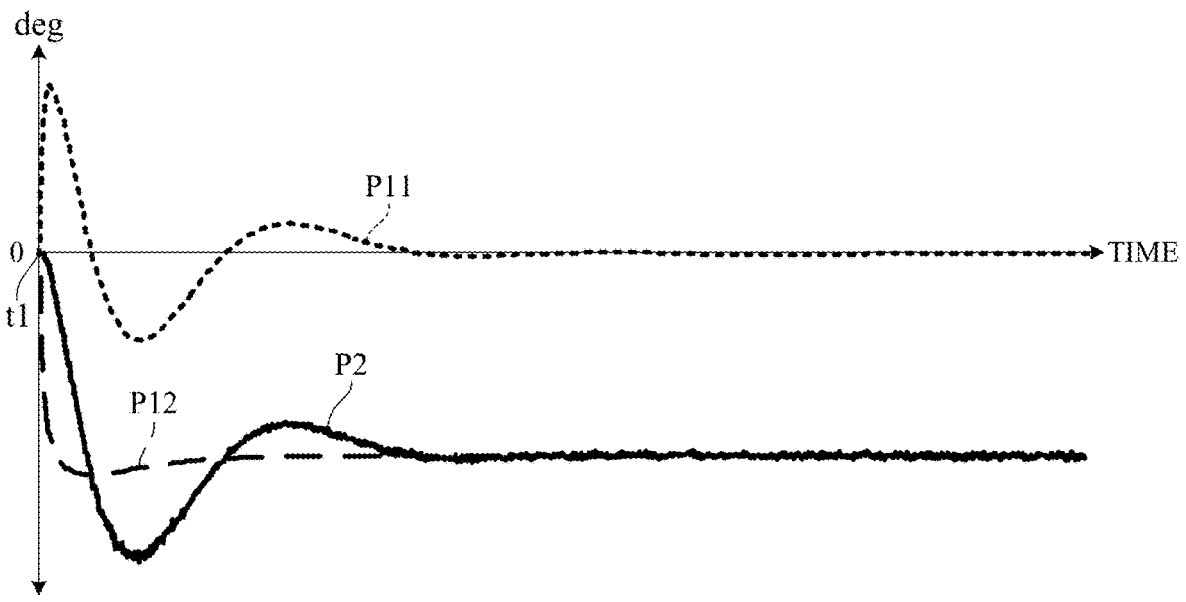
FIG. 4 is a diagram for describing a correction steering angle quantity and a reference steering angle quantity.

FIG. 4 is a diagram for describing the correction steering angle quantity and the reference steering angle quantity. In FIG. 4, a characteristic P11 indicates the correction steering angle quantity, and a characteristic P12 indicates the reference steering angle quantity. A characteristic P2 indicates an observation result of the steering angle of the subject vehicle 101 that has been detected by the steering angle sensor 2a. In FIG. 4, in a driving scene as illustrated in FIG. 2, the reference steering angle quantity that has been estimated by the steering angle control unit 161 and the correction steering angle quantity that has been calculated by the steering angle control unit 161 are indicated. The steering angle control unit 161 controls the steering actuator SA, based on the correction steering angle quantity (characteristic P11) and the reference steering angle quantity (characteristic P12). As a result, the steering angle of the steering wheel ST is controlled to be a value as indicated by the characteristic P2. Hereinafter, the control of the steering actuator SA based on the correction steering angle quantity will be referred to as steering angle compensation control, and the control of the steering actuator SA based on the reference steering angle quantity will be referred to as reference steering angle control.

Figure 5:
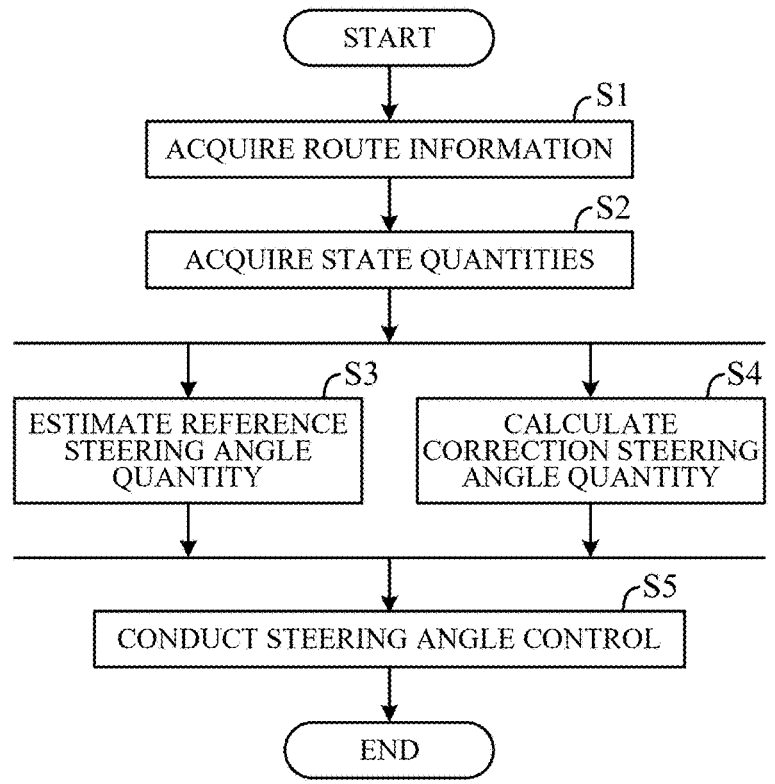
FIG. 5 is a flowchart illustrating an example of processing to be performed on a CPU of the controller in FIG. 3.

FIG. 5 is a flowchart illustrating an example of processing to be performed on the CPU of the controller 10 in FIG. 3 in accordance with a predetermined program. The processing in this flowchart is, for example, performed at a predetermined cycle while the subject vehicle 101 is traveling in the self-drive mode. In addition, for example, while the subject vehicle 101 is traveling in the manual drive mode, and a lane keep function that is one of the driving assistance functions is enabled, that is, while the subject vehicle is in lane keep driving, the processing is performed at a predetermined cycle.

First, in step S1, the controller 10 acquires information about the target path (hereinafter, referred to as route information). Specifically, the curvature of the target path that has been generated by the target position setting unit 151 is calculated. In step S2, the controller 10 acquires the state quantities. Specifically, a deviation amount (lateral positional deviation) in the lane width direction between the current position of the subject vehicle 101 and the target path along which the subject vehicle 101 should pass is calculated. In addition, a yaw angular velocity deviation is calculated, based on the yaw angular velocity of the subject vehicle 101 that has been detected by a yaw rate sensor (not illustrated) and a target yaw angular velocity. Further, the vehicle body direction is calculated, based on the extending direction of the target path and the vehicle length direction of the subject vehicle 101 recognized from the camera image or the like of the camera 1a. Note that the method for acquiring the vehicle body direction is not limited to this. Furthermore, a steering angular velocity that has been detected by the steering angular velocity sensor 2b is acquired. The steering angular velocity may be calculated, based on a sensor value (steering angle) of the steering angle sensor 2a.

Next, the controller 10 performs the processes of steps S3 and S4. The processes of steps S3 and S4 are performed in parallel. In step S3, the controller 10 estimates the reference steering angle quantity using the driving model, based on the route curvature acquired in step S1 and the state quantities acquired in step S2. In step S4, the controller 10 calculates a correction steering angle quantity, based on the route curvature acquired in step S1 and the target position (the target position in the lane width direction). In step S5, the controller 10 conducts steering angle control, based on the reference steering angle quantity estimated in step S3 and the correction steering angle quantity calculated in step S4. Specifically, the steering actuator SA is controlled in accordance with the compensated steering angle quantity obtained by adding the reference steering angle quantity to the correction steering angle quantity.

The operation of the driving control apparatus according to the present embodiment will be summarized as follows.

Figure 6:
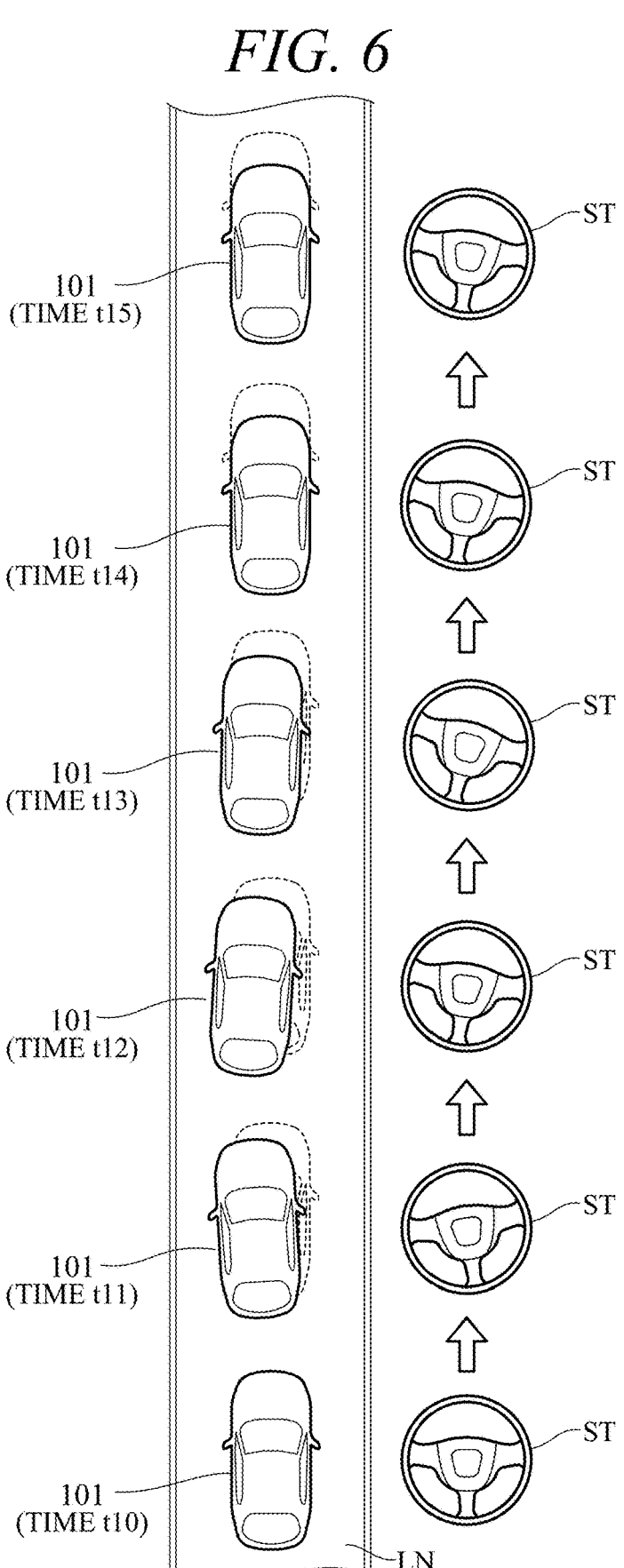
FIG. 6 is a diagram for describing the operation of the driving control apparatus according to the embodiment of the present invention.

FIG. 6 is a diagram for describing the operation of the driving control apparatus 50. In FIG. 6, a top view of the subject vehicle 101 and a front view of the steering wheel ST provided above the driver's seat of the subject vehicle 101 are illustrated in association with each other at each time from time $t_{10}$ to time $t_{15}$. While the subject vehicle 101 is traveling on the lane LN, and when the inclination of the road surface changes as illustrated in FIG. 2 at the traveling position at time $t_{10}$, that is, when the road surface on the right side in the advancing direction becomes higher than the road surface on the left side, the directions of the vehicle wheels (not illustrated) in both left and right end portions on the front side of the subject vehicle 101 rotate to the left with respect to the reference direction (extending direction of the lane LN) in accordance with the change in the inclination angle of the road surface. As a result, at time $t_{11}$, the direction of the vehicle body of the subject vehicle 101 is inclined to the left with respect to the reference direction, and the steering wheel ST rotates counterclockwise in accordance with the rotation angle (yaw angle) of the vehicle wheel. The vehicles indicated by broken lines in FIG. 6 each schematically represent a driving state of the subject vehicle 101 to be assumed when no disturbance occurs, that is, a normal driving state of driving while following the target position.

When the position in the lateral direction (vehicle width direction) of the subject vehicle 101 starts to deviate to the left from the target position at time $t_{11}$, the steering actuator SA is controlled to reduce the lateral positional deviation at time $t_{12}$, and the steering wheel ST starts to rotate clockwise. Then, at times $t_{13}$ to $t_{14}$, the steering actuator SA is controlled so that the direction of the vehicle body of the subject vehicle 101 corresponds to the reference direction while reducing the lateral positional deviation. As a result, from time $t_{14}$ to time $t_{15}$, the steering angle of the steering wheel ST of the subject vehicle 101 is maintained at an angle corresponding to the inclination angle of the lane LN, and the driving state of the subject vehicle 101 returns to the normal driving state of driving while following the target position. In this situation, the value of the reference steering angle quantity estimated in step S4 and the value of the actual steering angle of the subject vehicle 101 (detection value of the steering angle sensor 2a) are balanced (matched or substantially matched). Until the disturbance changes, the steering angle of the steering wheel ST is maintained at the angle illustrated at time $t_{15}$. Then, when the disturbance changes, the steering angle control corresponding to the changed disturbance is conducted. For example, when the inclination angle of the road surface changes (changes from an inclined state to a flat state) at the location where the inclined road ends, the position in the lateral direction (vehicle width direction) of the subject vehicle 101 starts to deviate to the right from the target position. Therefore, the steering actuator SA is controlled to reduce the lateral positional deviation, and the steering wheel ST starts to rotate to the left (counterclockwise). By the steering angle control as described heretofore, even when the traveling position of the subject vehicle 101 deviates from the target path due to the disturbance that has occurred while in the lane keep driving, it becomes possible to immediately return the traveling position of the subject vehicle 101 to the target path. Furthermore, also after the return, it becomes possible to maintain the traveling position of the subject vehicle 101 on the target path. Therefore, it becomes possible to satisfactorily continue the lane keep driving not only in a case of a temporary disturbance but also in a case where the influence caused by a disturbance continues over a certain distance like a cant road.

According to the embodiment of the present invention, the following operation and effect are achievable.

(1) The driving control apparatus 50 includes: the target position setting unit 151, which serves as a generation unit configured to generate a target path of the subject vehicle; the steering angle control unit 161, which controls the steering actuator SA of the subject vehicle 101 to travel following the target path that has been generated by the target position setting unit 151; the positional deviation amount calculation unit 131, which serves as a traveling position recognition unit configured to recognize the position of the subject vehicle 101; and the steering angular velocity sensor 2b, which detects a steering angular velocity of the subject vehicle 101. The steering angle control unit 161 calculates a compensated steering angle quantity necessary for maintaining a driving state (normal driving state)

in which the subject vehicle 101 travels while following the target path, based on the curvature of the target path that has been generated by the target position setting unit 151, the deviation amount in the lane width direction between the position of the subject vehicle 101 that has been recognized by the positional deviation amount calculation unit 131 and the target path, and the steering angular velocity that has been detected by the steering angular velocity sensor 2b, and also controls the steering actuator SA based on the compensated steering angle quantity. This enables the subject vehicle 101 to promptly return to the normal driving state, even when a disturbance occurs while in the lane keep driving and the traveling position of the subject vehicle 101 deviates from the target position. As a result, robustness at the time of the lane keep driving is improved.

Figure 7:
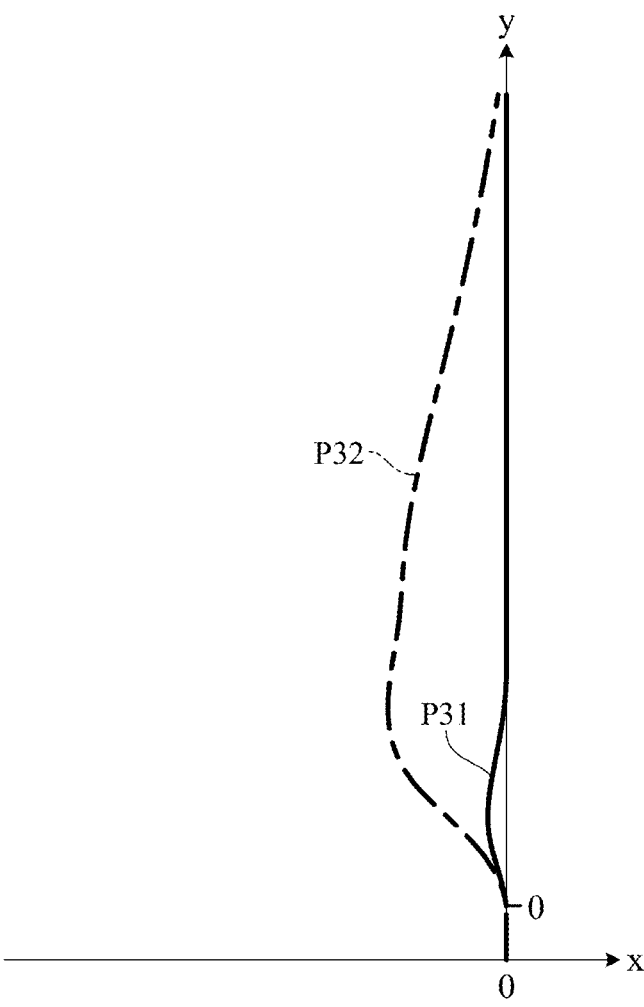
FIG. 7 is a diagram illustrating an example of a driving path of the vehicle when a disturbance occurs.

(2) The compensated steering angle quantity includes a correction steering angle quantity necessary for returning the position of the subject vehicle 101 to the target path and a reference steering angle quantity necessary for maintaining the position of the subject vehicle 101 on the target path. The steering angle control unit 161 conducts steering angle control (reference steering angle control) for controlling the steering actuator SA based on the reference steering angle quantity and steering angle control (steering angle compensation control) for controlling the steering actuator SA based on the correction steering angle quantity. In this manner, by conducting the steering angle control, based on the reference steering angle quantity and the correction steering angle quantity, the traveling position of the subject vehicle 101 can be returned to the target position with accuracy. FIG. 7 is a diagram illustrating an example of a driving path of the subject vehicle 101 when a disturbance occurs. A characteristic P31 indicates the driving path of the subject vehicle 101, when the steering angle control by the steering angle control unit 161, that is, the reference steering angle control and the steering angle compensation control are conducted in parallel in the driving scene illustrated in FIG. 6. A characteristic P32 denotes a characteristic as a comparative example in the above embodiment. The characteristic P32 indicates the driving path of the subject vehicle 101, when the conventional steering angle control is conducted to detect a lateral position deviation of the subject vehicle 101 and return the traveling position of the subject vehicle 101 to the target position in the identical driving scene to FIG. 6. In FIG. 7, the x-axis corresponds to the lane width direction of the lane LN on which the subject vehicle 101 travels, and the y-axis corresponds to the extending direction of the lane LN. In addition, the x coordinate of the target position (lane center) is set to 0, and the position in the y direction (y coordinate) of the subject vehicle 101 at time $t_{10}$ in FIG. 6 is set to 0. By estimating the reference steering angle quantity using the above driving model, it is possible to estimate the reference steering angle quantity that cancels the influence of the disturbance when the subject vehicle 101 starts to deviate from the target path. Therefore, by conducting the steering angle control, based on the reference steering angle quantity and the correction steering angle quantity, the traveling position of the subject vehicle 101 can be promptly returned to the target position with accuracy, as indicated by the characteristic P31 in FIG. 7.

(3) The driving control apparatus 50 further includes the steering torque sensor 2c, which receives a change instruction (torque input) of the steering angle quantity of the subject vehicle 101. Even though the steering torque sensor 2c receives the change instruction, the steering angle control unit 161 continues controlling the steering actuator SA based on the compensated steering angle quantity, in a case where the steering angle quantity designated by the change instruction, specifically, the steering angle quantity based on the steering torque that has been detected by the steering torque sensor 2c is smaller than a predetermined quantity. On the other hand, in a case where the steering torque sensor 2c receives the change instruction to designate the steering angle quantity equal to or larger than the predetermined quantity, the steering angle control unit 161 controls the steering actuator SA based on the steering angle quantity that has been designated by the change instruction. This enables suppression of unnecessary conduct of the steering angle control based on the compensated steering angle quantity (offset steering angle control), when the steering torque is input by the steering operation by the driver at the time of turning to the left or right, a lane change, or the like.

(4) The driving control apparatus 50 further includes: the exterior environment recognition unit 14, which recognizes an exterior environment situation in the surroundings of the subject vehicle 101; the memory unit 12, which stores map information of roads; and the navigation unit 6, which sets a target route on a road to a destination of the subject vehicle 101, based on the map information. The target position setting unit 151 generates a target path through which the subject vehicle 101 should pass on the target route, based on the target route that has been set by the navigation unit 6 and the exterior environment situation that has been recognized by the exterior environment recognition unit 14. This enables the lane keep assistance to be performed satisfactorily until the subject vehicle 101 reaches the destination.

(5) The exterior environment recognition unit 14 recognizes, as the exterior environment situation, a division line that defines the lane LN on which the subject vehicle 101 travels, and the target position setting unit 151 generates the target path, based on the position and the shape of the division line that has been recognized by the exterior environment recognition unit 14. Accordingly, the steering angle control in accordance with the division line is performed, so that satisfactory lane keep assistance can be performed.

The above-described embodiments can be modified in various manners. Hereinafter, modifications will be described. In the above embodiment, the positional deviation amount calculation unit 131 recognizes the position and the shape of the division line that defines the lane on which the subject vehicle 101 travels, based on the detection result (camera image) of the camera 1a. However, the division line may be recognized, based on a detection result of a detection unit other than the camera, such as a radar or a LiDAR. That is, the driving control apparatus may include a radar or a LiDAR in addition to or instead of the camera 1a.

In addition, in the above embodiment, the navigation unit 6 as a route setting unit is configured to set a target route on a road to a destination of the subject vehicle 101, based on the map information. However, the processing unit 11 of the controller 10 may function as the route setting unit. In this case, the processing unit 11 searches for a target route on the road to the destination that has been input by the driver, based on the current position of the subject vehicle that has been measured by the position measurement unit 4 and either the map information stored in the map database 5 or the map information stored in the memory unit 12.

Further, in the above embodiment, the steering angular velocity sensor 2b, which serves as the steering angular velocity detection unit, is configured to detect the steering angular velocity of the subject vehicle 101. However, the steering angular velocity detection unit may include any sensor, for example, the steering angle sensor 2a, other than the steering angular velocity sensor 2b. In this case, the steering angular velocity detection unit calculates its change amount (steering angular velocity), based on the steering angle that has been detected by the steering angle sensor 2a.

Furthermore, in the above embodiment, the steering torque sensor 2c, which serves as an instruction receiving unit, is configured to receive the steering torque that acts on the steering wheel ST, as the change instruction to change the steering angle quantity of the subject vehicle 101. However, as long as it is possible to detect the steering torque that acts on the steering wheel ST from the steering operation, the instruction receiving unit may be configured with any component other than the steering torque sensor 2c.

The above embodiment can be combined as desired with one or more of the above modifications. The modifications can also be combined with one another.

According to the present invention, robustness at the time of the lane keep driving can be improved.

Above, while the present invention has been described with reference to the preferred embodiments thereof, it will be understood, by those skilled in the art, that various changes and modifications may be made thereto without departing from the scope of the appended claims.

What is claimed is:

1. A driving control apparatus comprising:
a sensor configured to detect a steering angular velocity; and
a microprocessor configured to perform:
generating a target path of a subject vehicle;
controlling a steering actuator of the subject vehicle to travel following the target path; and
recognizing a position of the subject vehicle, wherein
the microprocessor is configured to perform
the controlling including calculating a compensated steering angle quantity necessary for maintaining a driving state in which the subject vehicle travels while following the target path, based on a curvature of the target path, a deviation amount in a lane width direction between the position of the subject vehicle and the target path, and the steering angular velocity detected by the sensor, and also controlling the steering actuator based on the compensated steering angle quantity.

2. The driving control apparatus according to claim 1, wherein
the compensated steering angle quantity includes a correction steering angle quantity necessary for returning the position of the subject vehicle to the target path and a reference steering angle quantity necessary for maintaining the position of the subject vehicle on the target path.

3. The driving control apparatus according to claim 2, wherein
the microprocessor is configured to perform
the controlling including conducting steering angle control for controlling the steering actuator based on the reference steering angle quantity and steering angle control for controlling the steering actuator based on the correction steering angle quantity.

4. The driving control apparatus according to claim 3, wherein
the sensor is a first sensor,
the driving control apparatus further comprises a second sensor configured to detect a steering torque, and
the microprocessor is configured to perform
the controlling including continuing controlling the steering actuator based on the compensated steering angle quantity, in a case where the steering angle quantity based on the steering torque detected by the second sensor is smaller than a predetermined quantity.

5. The driving control apparatus according to claim 4, wherein the microprocessor is configured to perform the controlling including, in a case where the second sensor detects the steering torque corresponding to the steering angle quantity equal to or larger than the predetermined quantity, controlling the steering actuator based on the steering angle quantity based on the steering torque.

6. The driving control apparatus according to claim 1 further comprises:

a detection unit configured to detect a target object surrounding the subject vehicle; and a memory coupled to the microprocessor; wherein the memory stores map information of a road, and the microprocessor is configured to further perform:

recognizing an exterior environment situation surrounding the subject vehicle; and setting a target route on the road to a destination of the subject vehicle, based on the map information, and wherein the microprocessor is configured to further perform the generating including generating the target path through which the subject vehicle should pass on the target route, based on the target route and the exterior environment situation.

7. The driving control apparatus according to claim 6, wherein the microprocessor is configured to perform:

the recognizing including recognizing, as the exterior environment situation, a division line defining a lane on which the subject vehicle travels; and the generating including generating the target path, based on a position and a shape of the division line.

* * * * *